United States Patent
Subrahmanyam et al.

(10) Patent No.: US 6,862,154 B1
(45) Date of Patent: Mar. 1, 2005

(54) DISK DRIVE HAVING A RAMP USED FOR THE CONTROLLED LOADING OF A HEAD OF A HEAD STACK ASSEMBLY ONTO A DISK

(75) Inventors: Jai N. Subrahmanyam, Santa Clara, CA (US); Serge Hauert, San Jose, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 241 days.

(21) Appl. No.: 10/329,109

(22) Filed: Dec. 24, 2002

(51) Int. Cl.⁷ .............................................. G11B 21/02
(52) U.S. Cl. ........................................................ 360/75
(58) Field of Search ................................ 360/75, 73.03, 360/78.04, 98.01, 256

(56) References Cited

U.S. PATENT DOCUMENTS 5,973,887 A * 10/1999 Cameron ................. 360/254.8

* cited by examiner

Primary Examiner—Sinh Tran
Assistant Examiner—Mitchell Slavitt
(74) Attorney, Agent, or Firm—Milad G. Shara, Esq.; Blakely, Sokoloff, Taylor & Zafman

(57) ABSTRACT

Disclosed is a ramp used for the controlled loading of a head of a head stack assembly (HSA) onto a disk of a disk drive. The HSA includes an actuator arm, a head, and a loading surface. The ramp comprises a base structure and at least one ramp finger projecting approximately perpendicularly from the base structure. In order to load the head in a controlled manner onto the disk, the loading surface of the HSA is rotated along the ramp finger until the head is in a load position. The base structure is then actuated in a vertical direction such that the ramp finger is correspondingly actuated in the vertical direction towards the disk until the head is loaded onto the disk.

25 Claims, 5 Drawing Sheets

DISK DRIVE HAVING A RAMP USED FOR THE CONTROLLED LOADING OF A HEAD OF A HEAD STACK ASSEMBLY ONTO A DISK

BACKGROUND OF THE INVENTION

1. Field of the Invention

The present invention relates to disk drives. More particularly, the present invention relates to disk drives that include a ramp used for the controlled loading of a head of a head stack assembly onto a disk of the disk drive.

2. Description of the Prior Art and Related Information

Ramp-loading disk drives utilize a ramp to transition a flying head off-of and back-onto a flying area above the surface of the rotating disk. The ramp typically interacts with a lift tab that supports the head. The disk is spun-up while the lift tab is on the ramp and the head is not in contact with the disk. Once the disk is rotating at a specific speed, the lift tab is moved down the ramp such that an air bearing is developed between the head and the disk. The head may then move free of the ramp. Before the disk is spun-down, the lift tab is moved onto the ramp such that the head is moved away from the disk.

One method of increasing the storage capacity of disk drives is to store data more densely on each disk. One of the consequences of storing data more densely on a disk, however, is that the head must be correspondingly decreased in size and must fly closer to the recording surface of the disk. Another method of increasing the storage capacity is to manufacture disk drives with a greater number of stacked platters (i.e. individual disks). The latter method has led to relatively tall disk stacks, for example, three or more individual disks, each of which has two recording surfaces. However, it has proven difficult to precisely align each of the ramps to the respective recording surfaces of each disk in a tall disk stack.

The loading of heads of the head stack assembly (HSA) onto disks of a disk stack is typically accomplished utilizing sloped ramps that are made out of stainless steel. The slope of the sloped ramps is designed to load each head onto each disk with a low occurrence rate of head disk interactions. Head disk interactions, such as head slaps, may increase the risk of head and disk damage. Unfortunately, head disk interactions, such as head slaps, still occur and with time, and after many uses, the slope of the sloped ramps may change such that they may fail to adequately control the load velocity of the heads onto the disks properly. This failure to control the load velocity leads to an increased rate of head slaps when heads of the HSA are loaded onto disks of the disk stack. In addition, current sloped ramps create a certain amount of lateral motion between the head and the disk when the head is loaded onto the disk, which increases the risk of head and disk damage due to head disk interactions.

SUMMARY OF THE INVENTION

In one aspect, the invention may be regarded as a ramp used in the controlled loading of a head of an HSA onto a disk of a disk drive. The HSA includes an actuator arm, a head, and a loading surface. The ramp comprises a base structure and at least one ramp finger projecting approximately perpendicularly from the base structure. In order to load the head in a controlled manner onto the disk, the loading surface of the HSA is rotated along the ramp finger until the head is in a load position. The base structure is then actuated in a vertical direction such that the ramp finger is correspondingly actuated in the vertical direction towards the disk until the head is loaded onto the disk.

In one embodiment, the ramp finger of the ramp comprises a bimetallic strip. In this case, the loading of the head of the HSA onto the disk in a controlled manner is accomplished by providing current to the bimetallic strip of the ramp finger causing the ramp finger to be actuated in the vertical direction towards the disk until the head is loaded onto the disk. A digital-to-analog converter (DAC) may be used to control the amount of current provided to the bimetallic strip.

In another embodiment, the base structure of the ramp may include a MicroElectricalMechanical system (MEMS) device. In this case, the loading the head of the HSA onto the disk in a controlled manner may be accomplished by providing current to the MEMS device causing the ramp finger to be moved in a vertical direction towards the disk until the head is loaded onto the disk. As an example, a DAC may be used to control the amount of current provided to the MEMS device.

In another aspect, the invention may be regarded as a method for the controlled loading of a head of an HSA onto a disk in a disk drive. The HSA includes an actuator arm, a head, and a loading surface. The method includes rotating the loading surface of the HSA along a ramp until the head is in a load position and loading the head of the HSA onto the disk in a controlled manner. Loading the head in a controlled manner includes actuating the ramp in a vertical direction towards the disk until the head is loaded onto the disk. For example, in one embodiment, the ramp includes a base structure and at least one ramp finger projecting approximately perpendicularly from the base structure.

In one embodiment, the ramp finger of the ramp comprises a bimetallic strip. In this case, loading the head of the HSA onto the disk in a controlled manner is accomplished by providing current to the bimetallic strip of the ramp finger causing the ramp finger to be actuated in the vertical direction towards the disk until the head is loaded onto the disk. For example, the amount of current provided to the bimetallic strip may be controlled utilizing a DAC.

In another embodiment, the base structure of the ramp includes a MEMS device. In this case, loading the head of the HSA onto the disk in a controlled manner further includes providing current to the MEMS device causing the ramp finger to be moved in a vertical direction towards the disk until the head is loaded onto the disk. For example, the amount of current provided to the MEMS may be controlled utilizing a DAC.

In an additional aspect, the invention may be regarded as a disk drive comprising: a disk for rotation within the disk drive; an HSA including an actuator arm, a loading surface, and a head for writing and reading data to and from the disk; and a ramp used for the controlled loading of the head of the HSA onto the disk. The ramp includes a base structure and at least one ramp finger projecting approximately perpendicularly from the base structure. In order to load the head in a controlled manner onto the disk, the loading surface of the HSA is rotated along the ramp finger until the head is in a load position. Then, the base structure is actuated in a vertical direction such that the ramp finger is correspondingly actuated in the vertical direction towards the disk until the head is loaded onto the disk.

In one embodiment, the ramp finger of the ramp may include a bimetallic strip. In this case, the head of the HSA may be loaded onto the disk in a controlled manner by providing current to the bimetallic strip of the ramp finger causing the ramp finger to be actuated in the vertical direction towards the disk until the head is loaded onto the disk.

In another embodiment, the base structure may include a MEMS device. In this case, the head of the HSA may be loaded onto the disk in a controlled manner by providing current to the MEMS device causing the ramp finger to be moved in a vertical direction towards the disk until the head is loaded onto the disk.

The foregoing and other features of the invention are described in detail and are set forth in the appended claims.

DETAILED DESCRIPTION

Figure 1:
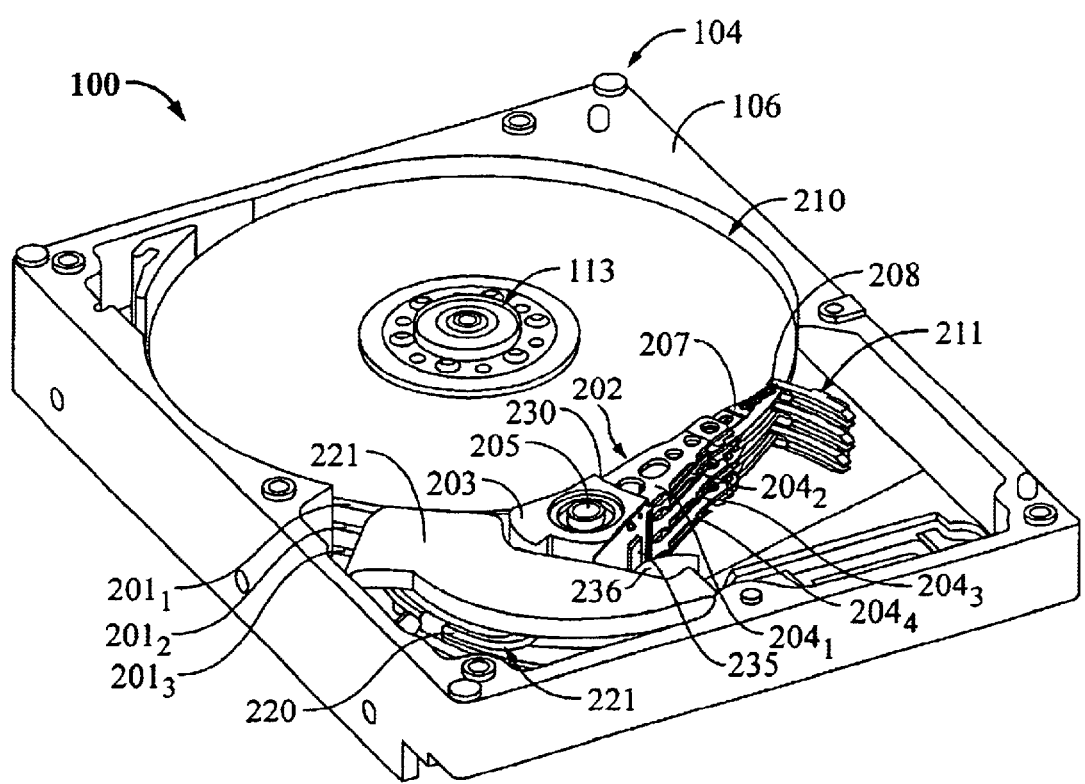
FIG. 1 is a perspective view of an exemplary disk drive 100 in which embodiments of the invention for a ramp used for the controlled loading of a bead onto a disk may be practiced.

FIG. 1 is a perspective view of an exemplary disk drive 100 including an example of a head disk assembly (HDA) 104, in which embodiments of the invention for a ramp used for the controlled loading of a head onto a disk may be practiced. It should be appreciated that FIG. 1 is only an example. Particularly, FIG. 1 shows the principal components of a common magnetic disk drive. The disk drive 100 may, for example, be an Integrated Drive Electronics (IDE) drive comprising a HDA 104 and a PCBA (not shown). The disk drive is shown with the cover removed to show the internal details of the HDA 104.

With reference to FIG. 1, the HDA 104 includes a base 106 and a separate, discrete cover (not shown) that can be attached to the base 106 to collectively house a disk stack 210 that includes a plurality of magnetic disks 201, a spindle motor 113 attached to the base 106 for rotating the disk stack 210, a head stack assembly (HSA) 202, and a pivot-bearing cartridge 205 (such as a stainless steel pivot bearing cartridge, for example) that rotatably supports the HSA 202 on the base 106. The base 106 is typically attached to the separate cover by means of screws or other discrete fasteners. The spindle motor 113 rotates the disk stack 210 at a constant angular velocity about the spindle motor 113.

In this example, the HSA 202 comprises a rotary actuator assembly 230 having at least one head gimbal assembly (HGA) 207 and a flex circuit cable assembly 235. The rotary actuator assembly 230 includes a body portion 203, at least one actuator arm 204 cantilevered from the body portion 203, and a coil portion 220 that is cantilevered from the body portion 203 in an opposite direction from the at least one actuator arm 204. The at least one actuator arm 204 supports at least one HGA 207 having a head. The flex cable assembly 235 includes a flex circuit cable 236. The HSA 202 is pivotally secured to the base 106 via the pivot-bearing cartridge 205 so that heads at the distal end of the HGAs 207 may be moved over a recording surface of the disk 201. The storage capacity of the HDA 104 may be increased by including additional disks 201 in the disk stack 210 and by the HSA 120 having a vertical stack of HGAs 207 supported by multiple actuator arms 204.

In this example, the HSA 202 includes a plurality of actuator arms $204_{1-4}$ cantilevered from the body portion 203. As shown, each actuator arm $204_{1-4}$ supports at least one head gimbal assembly (HGA) 207, respectively. Each HGA 207 includes a lift tab 208 (only one of which is clearly shown) and an associated head (not shown) for loading onto a recording surface of a respective disk $201_{1-3}$.

Additionally, the coil portion 220 is disposed between a first voice coil motor (VCM) plate 221 and a second VCM plate (not shown) to form a voice coil motor 224, which causes the HSA 202 to pivot about pivot-bearing cartridge 205 to cause the read/write heads of the HSA 202 to sweep radially over the recording surfaces of the respective disks $201_{1-3}$.

FIG. 1 further shows a ramp 211 used for the controlled loading of a head of HSA 202 onto a disk 201 of disk drive 100, according to one embodiment of the present invention. The ramp 211 may be used for the controlled loading of the heads of the actuator arms $204_{1-4}$ onto the disks $201_{1-3}$ of the disk stack 210 when the disk drive 100 is powered on; and to unload the heads from the disks $201_{1-3}$ of the disk stack 210 when the disk drive is powered down. As shown in FIG. 1, the ramp 211 may be performing a load operation, in which each lift tab 208 associated with each head is in a load position above or below the outer diameter of the top or bottom recording surface of a disk $201_{1-3}$, respectively, to which the head is to be loaded onto in a controlled manner. For example, in FIG. 1, the ramp 211 may be considered to be in the loading process, after the disk drive 100 has been powered on. The ramp 211 used for controlled loading (and unloading) will now be particularly discussed in detail with reference to FIGS. 2A–2C.

Figure 2A:
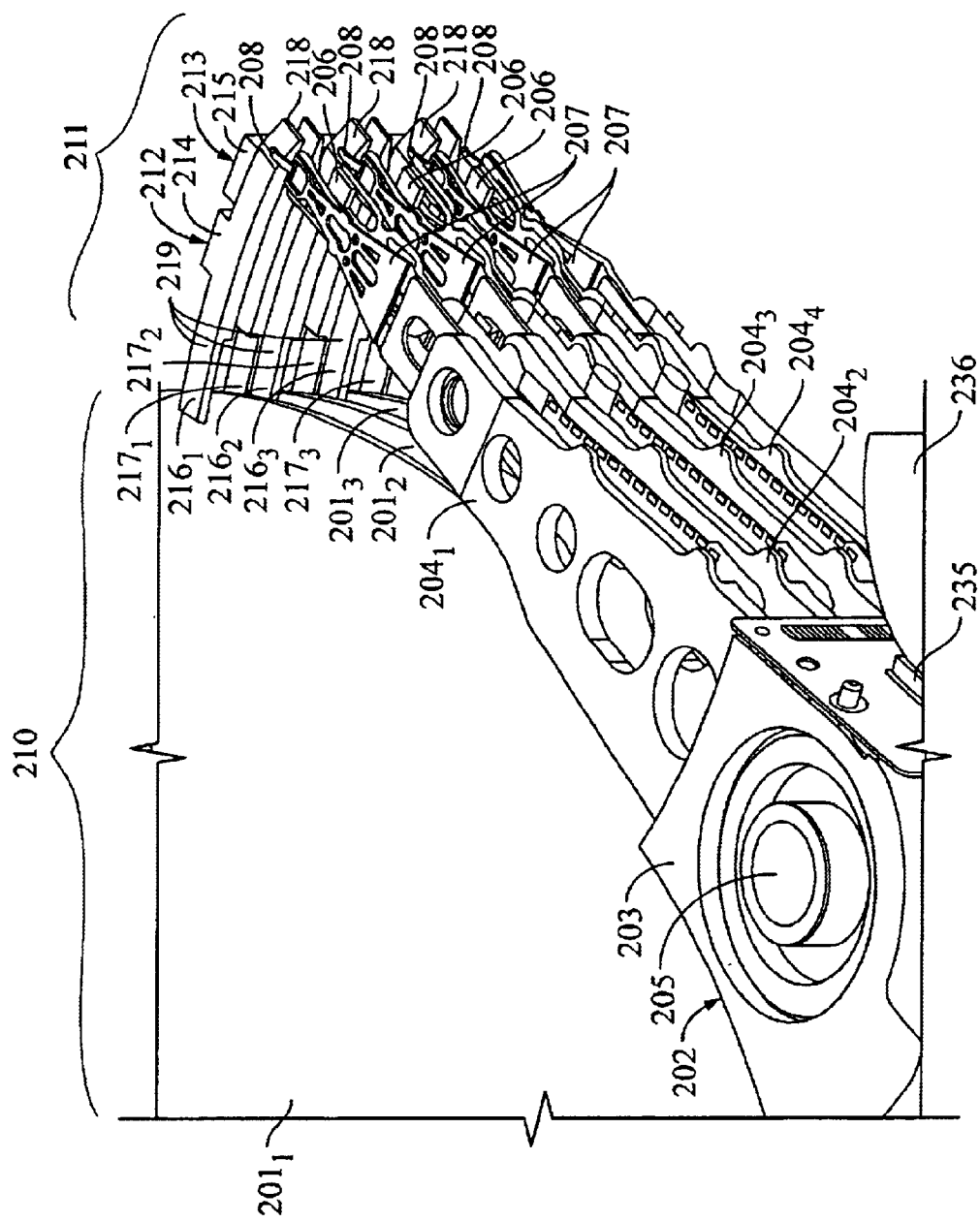
FIG. 2A is a perspective view of an HSA loaded onto a ramp used for controlled loading, according to one embodiment of the present invention.

With reference now to FIG. 2A, FIG. 2A shows an example of an HSA loaded onto a ramp 211, in which the ramp 211 is used for the controlled loading of heads of an HSA onto disks, according to one embodiment of the present invention. Particularly, FIG. 2A shows loading surfaces 208 associated with the heads 206 of the HSA 202 engaged or loaded onto the ramp 211. It should be appreciated that any type of loading surface can be utilized such as lift tabs or dimpled surfaces. In this embodiment, lift tabs 208 are utilized. For example, FIG. 2A may be used to illustrate the first step of the loading process wherein the disk drive 100 has been powered on and the loading tabs 208 are still loaded or parked at the distal end of the ramp 211.

A brief description of the exemplary HSA 202 will now be given. It should be appreciated that this is only an example of an HSA 202 for use with the ramp 211 and that a wide variety of HSAs having differing types of structures may be used. This is but one example. The example of the HSA 202 corresponds to the example of FIG. 1 and is useable in the disk drive 100 of FIG. 1. In this example, the HSA 202 includes a plurality of actuator arms $204_{1-4}$ cantilevered from a body portion 203. The HSA 202 is rotatable about a pivot-bearing cartridge 205. Further, each actuator arm $204_{1-4}$ supports at least one head gimbal assembly (HGA) 207, respectively. Each HGA 207 includes a lift tab 208 and an associated head 206 for loading onto a recording surface of a disk 201.

As shown in FIG. 2A, in this example, three disks $201_1$, $201_2$, $201_3$ are shown. Each disk $201_{1-3}$ has a top and bottom recording surface, respectively. It should be appreciated that the exemplary HSA 202 having four actuator arms $204_{1-4}$ for use with the disk stack 210 having three disks $201_{1-3}$ is only an example to illustrate the operation of the ramp 211. It should further be appreciated that an HSA having any number of actuator arms with suitable HGAs for merging with a disk stack assembly having any number of disks may be utilized with a properly constructed ramp 211.

Figure 2B:
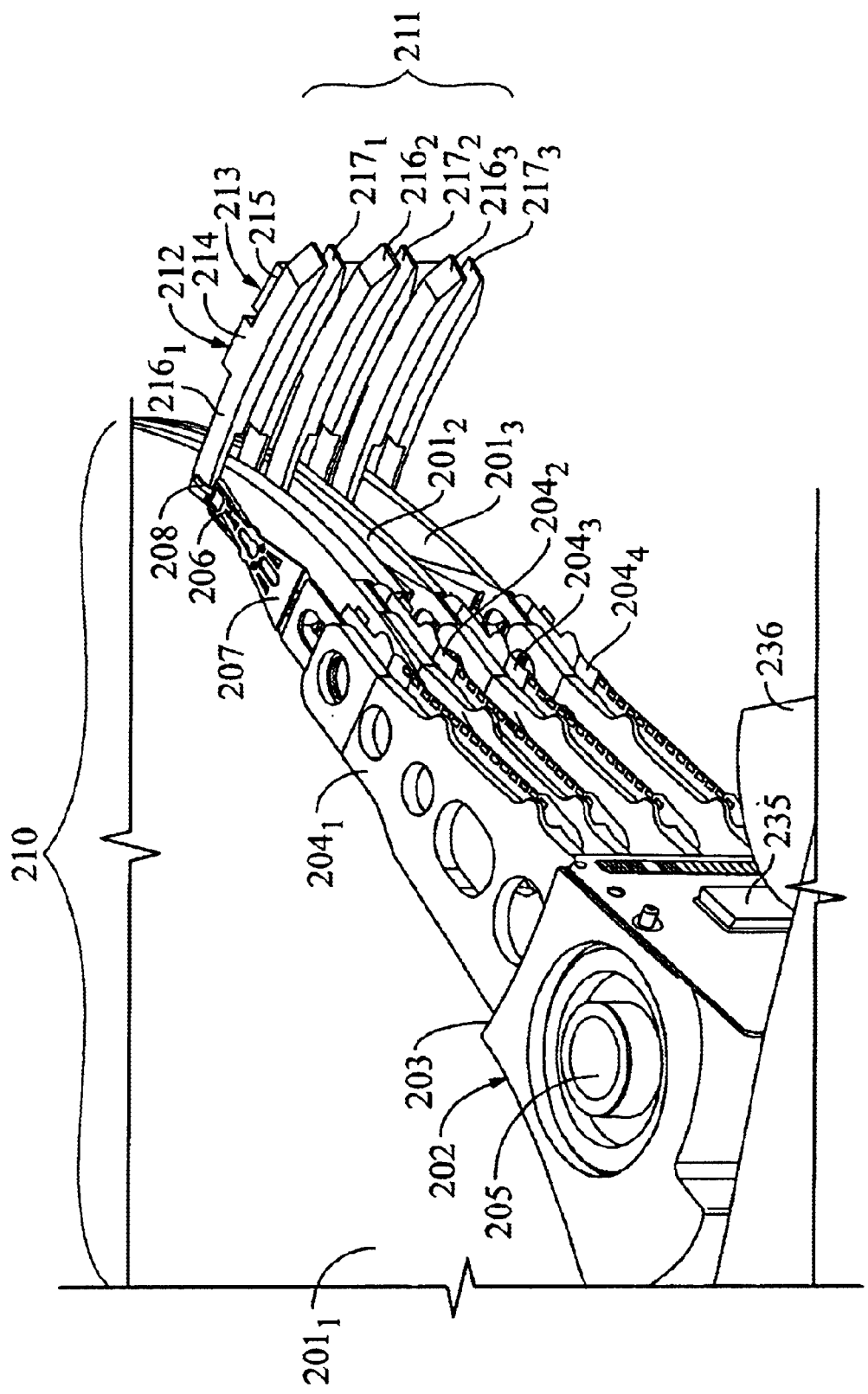
FIG. 2B is a perspective view illustrating that lift tabs associated with each head have been rotated along the ramp used for controlled loading such that each of the heads are in a load position above or below the outer diameter of the top or bottom surface of each disk, respectively.
Figure 2C:
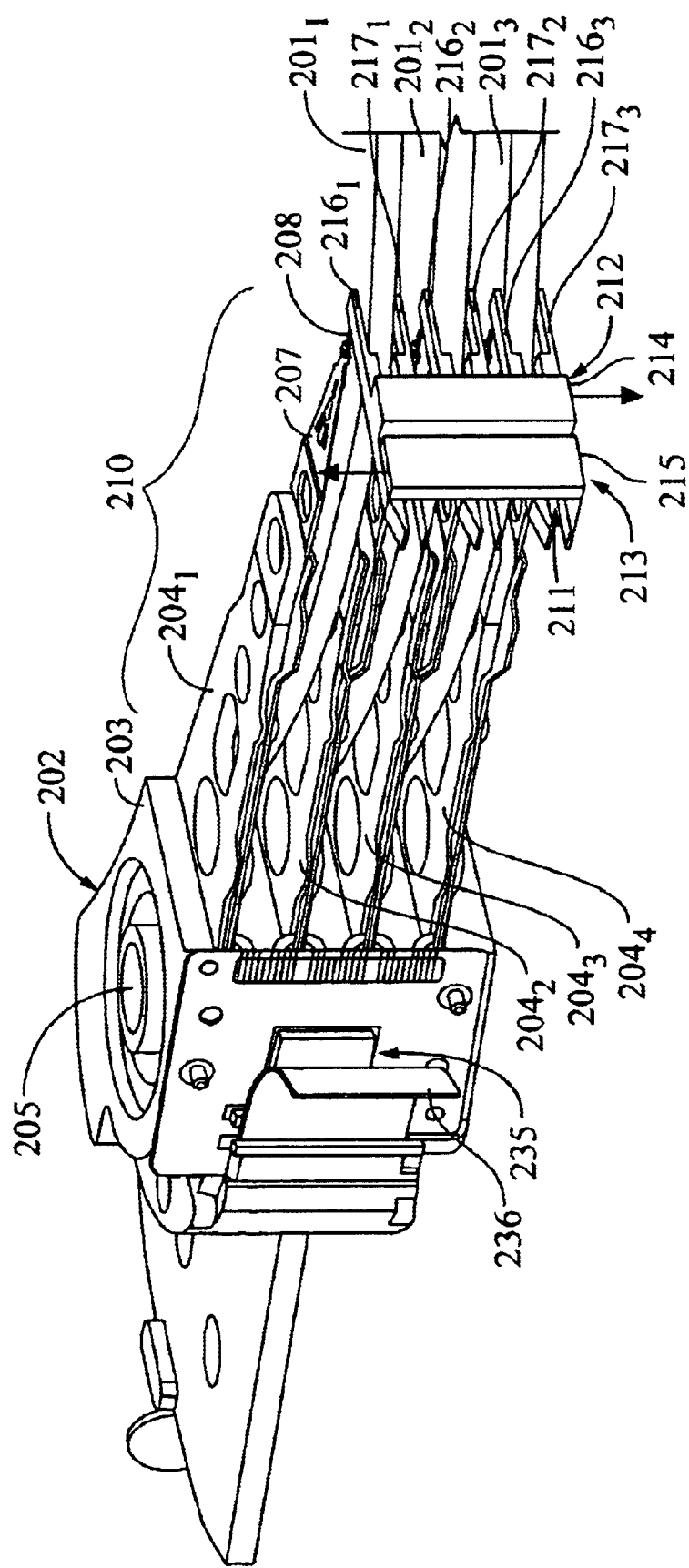
FIG. 2C is a perspective view illustrating the loading of each head of the HSA in a controlled manner onto the disks by the ramp used for controlled loading by actuating the ramp in vertical directions.

Aspects of the ramp 211, according to one embodiment of the present invention, will now be discussed with reference to FIG. 2A. However, reference can also be made to FIGS. 2B–2C, which illustrate other views of the ramp 211, to aid in the illustration of the ramp 211. FIGS. 2B–2C will each be individually discussed in detail later.

The ramp 211 includes a first ramp sub-structure 212 and second ramp sub-structure 213. These two ramp substructures 212 and 213 may be separately formed and interlocked to one another or they may be integrally formed together. The first ramp sub-structure 212 includes a rectangularly-shaped base structure 214 and a plurality of ramp fingers $216_{1-3}$ that project approximately perpendicularly from the base structure 214. However, it should be appreciated that the first ramp sub-structure 212 may include any number of ramp fingers 216 depending upon the number of disks 201 in the disk stack assembly 210 for the disk drive 100.

Each of the ramp fingers $216_{1-3}$ are identical in structure and function and therefore will be described generally as ramp fingers 216. As shown in FIG. 2A, each ramp finger 216 includes a sloped lift tab loading surface 218 at a distal end upon which the lift tab 208 for an associated head 206 is engaged or loaded onto when the disk drive is powered down during the unloading process. Particularly, when the disk drive is powered down and the heads 206 are unloaded, the HSA 202 is rotated away from the disks 201 such that the lift tabs are rotated up the ramp fingers 216 removing the heads 206 from the disks 201 and the lift tabs 208 and corresponding heads are parked onto the loading surface 218.

Each ramp finger 216 further includes a ramp surface 219 that extends slightly beyond the outer circumference of the disk and above the top recording surface of the disk 201 to which the head 206 is to be loaded onto, as shown in FIG. 2A.

Similarly, the second ramp sub-structure 213 includes a rectangularly-shaped base structure 215 and a plurality of ramp fingers $217_{1-3}$ projecting approximately perpendicularly from the base structure 215. Again, each of the ramp fingers $217_{1-3}$ are identical in structure and function and therefore will be described generally as ramp fingers 217.

Each ramp finger 217 likewise includes a sloped lift tab loading surface (not shown) at a distal end upon which the lift tab 208 for an associated head 206 is engaged or loaded onto after the disk has been powered down, as previously discussed above. Each ramp finger 217 further includes a ramp surface (not shown) that extends slightly beyond the outer circumference of the disk and below the bottom recording surface of the disk 201 to which the head 206 is to be loaded onto, as shown in FIG. 2A.

It should be appreciated that first ramp sub-structure 212 having identical ramp fingers $216_{1-3}$ is similar in structure and function to second ramp sub-structure 213 having identical ramp fingers $217_{1-3}$; except that ramp fingers $217_{1-3}$ are reversed in comparison to ramp fingers $216_{1-3}$ in order to allow a head 206 of an associated HGA 207 to be loaded onto a respective bottom recording surface of a respective disk 201 whereas ramp fingers $216_{1-3}$ allow a head 206 of a respective HGA 207 to be loaded onto with a respective top recording surface of a respective disk 201. Accordingly, the first and second ramp sub-structures 212 and 213 and their respective ramp fingers $216_{1-3}$ and $217_{1-3}$ will be described generally together, as a description of one similarly applies to the other.

Turning now to FIG. 2B, FIG. 2B illustrates that during a load operation, the lift tabs 208 associated with each head 206 are rotated along the ramp surfaces of their respective ramp fingers $216_{1-3}$ and $217_{1-3}$ of each ramp sub-structure 212 and 213 respectively, until each of the heads 206 are in a load position above or below the outer diameter of the top or bottom recording surface of the disk $201_{1-3}$, respectively, to which they are to be loaded onto in a controlled manner. This is accomplished by the HSA 202 being rotated about the pivot-bearing cartridge 205 as part of the head loading operation. Particularly, each head 206 is displaced vertically by a vertical displacement value from the surface of the disk 201 to which it is to be loaded onto. Upon loading, this vertical displacement value will become zero such that the head is loaded onto the disk It should be appreciated that during a static load, the disk is not rotating and thus when the head is loaded onto the disk the head actually contacts the disk. Alternatively, during a dynamic load, the disk is rotating and when the head is loaded onto the disk an air-bearing exists between the head and the rotating disk such that the head does not actually directly contact the disk. Typically, dynamic loads are performed at the outer diameter of the disk and static loads are performed at the inner diameter of the disk. However, it should be appreciated that either dynamic or static loads can be performed at either one of the inner or outer diameters of the disk, depending on what is desired.

Further, although embodiments of the inventions shown in FIGS. 2A–2C illustrate the loading of the heads 206 occurring at the outer diameters of the disks $201_{1-3}$, it should be appreciated that by suitably extending the ramps fingers $216_{1-3}$ and $217_{1-3}$ of the ramp 211 that inner diameter loads can just as easily be performed.

Referring now to FIG. 2C, FIG. 2C illustrates the loading of each head 206 of the HSA 202 onto the disks $201_{1-3}$ in a controlled manner by actuating the ramp 211 in vertical directions. Particularly, FIG. 2C shows that the first ramp sub-structure 214 is actuated in a vertical direction downwards towards the top surface of each the disk $201_{1-3}$ such that each ramp finger $216_{1-3}$ is correspondingly actuated in the vertical direction by a vertical displacement value towards the disk $201_{1-3}$ until the associated head 206 is loaded onto the top surface of the associated disk $201_{1-3}$.

Similarly, the second ramp sub-structure 215 is actuated in a vertical direction upwards towards the bottom surface of each disk $201_{1-3}$ such that each ramp finger $217_{1-3}$ is correspondingly actuated in the vertical direction by a vertical displacement value towards the disk $201_{1-3}$ until the associated head 206 is loaded onto the bottom surface of the associated disk $201_{1-3}$.

Accordingly, the heads 206 of the actuator arms $204_{1-4}$ are loaded onto the top and bottom surfaces of the disks $201_{1-3}$, at their outer diameters, respectively, in a controlled manner. In this way, because the heads 206 are loaded in a controlled manner, the problem of head slaps and other problematic head disk interactions which increases the risk of head damage are reduced. Further, the problem of lateral motion between the head and disk, which increases the risk of head damage due to head disk interactions, is reduced.

It should be appreciated to those skilled in the art that the unloading process, for unloading the heads 206 back onto the ramp 211 when the disk drive 100 is powered down, is basically the opposite of the loading process discussed with reference to FIGS. 2A–2C, and will not be discussed in detail for brevity's sake.

However, to briefly outline the unloading process, for when the disk drive 100 is to be powered down, with reference to FIG. 2C, the first ramp sub-structure 214 is actuated in a vertical direction downwards towards the top surface of each the disk $201_{1-3}$ such that each ramp finger $216_{1-3}$ is correspondingly actuated in the vertical direction by a vertical displacement value towards the disk $201_{1-3}$ such that each associated head 206 can be rotated back onto each associated ramp finger $216_{1-3}$. Similarly, the second ramp sub-structure 215 is actuated in a vertical direction upwards towards the bottom surface of each disk $201_{1-3}$ such that each ramp finger $217_{1-3}$ is correspondingly actuated in the vertical direction by a vertical displacement value towards the disk $201_{1-3}$ such that each associated head 206 can be rotated back onto each associated ramp finger $217_{1-3}$.

Then, the HSA 202 can be rotated away from the disks $201_{1-3}$ such that the lift tabs 208 are rotated back onto the ramp fingers $216_{1-3}$ and $217_{1-3}$, respectively, (see FIG. 2B) removing the heads 206 from the disks $201_{1-3}$; and the lift tabs 208 and the corresponding heads 206 are further rotated up the ramp fingers $216_{1-3}$ and $217_{1-3}$ and are parked onto the loading surfaces (e.g. 218), as shown in FIG. 2A.

Further, as previously discussed, the HSA 202 and disk stack 210 of disks $201_{1-3}$ used for illustrating the operation of the ramp 211 are only for illustrative purposes. The ramp 211 can be used with a wide variety of HSAs and disks in loading and unloading operations. Further, the ramp 211 according to embodiments of the present invention, has been illustrated with reference to six ramp fingers $216_{1-3}$ and $217_{1-3}$, however, it should be appreciated by those skilled in the art that the ramp 211 can be constructed with any number of ramp fingers depending upon the number of actuator arms and HGAs of the HSA to be merged with a corresponding number of disks.

Also, the ramp fingers $216_{1-3}$ and $217_{1-3}$ of the ramp 211 have been discussed moving in vertical directions by vertical displacement values to load and unload respective heads to and from respective disks. It should be appreciated that these vertical displacement values can be predetermined individually for each ramp finger or for all of the ramp fingers together, and effectuated by a disk controller system of the PCBA of the disk drive 100 controlling the load and unload operations to move ramp 211 such that either selected ramp fingers, or all of the ramp fingers in unison, are moved by the predetermined vertical displacement values. Alternatively, the disk controller system of the PCBA of the disk drive 100 can cause the ramp 211 to move the ramp fingers individually and selectively, or in unison, in vertical directions by continuously updated vertical displacement values calculated between the heads and surfaces of the disk as part of a feedback system; wherein these vertical displacement values can be continuously calculated by well-known measurement and feedback systems.

Figure 3A:
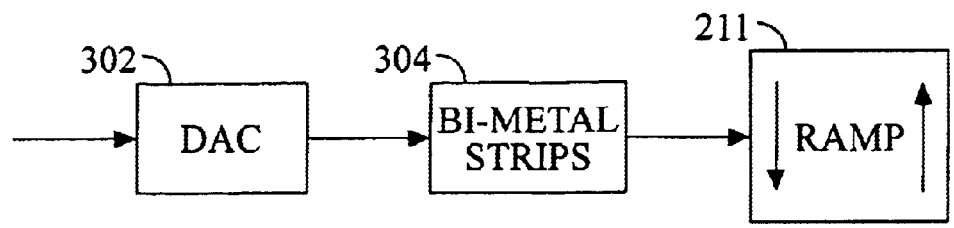
FIG. 3A is block diagram illustrating that the ramp fingers of the ramp may comprise bimetallic strips in order to actuate the ramp in vertical directions, according to one embodiment of the invention.

Particular embodiments of the ramp 211 will now be discussed. For example, with reference to FIG. 3A, FIG. 3A shows that in one embodiment, each of the ramp fingers $216_{1-3}$ and $217_{1-3}$ of the ramp 211 may comprise bimetallic strips 304. Bimetallic strips are known in the art. Basically, by applying a positive or negative current or voltage to a bimetallic strip ramp finger, the bimetallic strip ramp finger expands in one direction or the other. Accordingly, the ramp 211 is moved in an appropriate up or down vertical direction. Thus, the heads 206 of the HSA 202 can be loaded onto the disks $201_{1-3}$ in a controlled manner by providing current to the bimetallic strip ramp fingers $216_{1-3}$ and $217_{1-3}$ causing the ramp fingers to be actuated in appropriate up or down vertical directions towards the disks $201_{1-3}$ until the heads 206 are loaded onto the respective bottom or top surfaces of the disks, respectively, as was previously discussed with reference to FIG. 2C. Also, the bimetallic strip ramp fingers $216_{1-3}$ and $217_{1-3}$ can be moved in appropriate up or down vertical directions as part of the unloading operation, as previously discussed.

This can be accomplished, as shown in FIG. 3A, by a digital-to-analog converter (DAC) 302 that provides positive or negative current to bimetallic strips 304, or more particularly, to bimetallic strip ramp fingers $216_{1-3}$ and $217_{1-3}$ of the ramp 211—causing the bimetallic strip ramp fingers to be actuated vertically in appropriate directions such that each head 206 is loaded onto the appropriate top or bottom surface of the corresponding disk $201_{1-3}$ in a controlled manner, as discussed with reference to FIG. 2C. Also, this embodiment can be used in the unloading operation, as previously discussed. In one embodiment, the DAC 302 can be located in the base structure 214 or 215 of the ramp 211. However, the DAC 302 can also be located at other locations in the disk drive (e.g. on the PCBA).

Figure 3B:
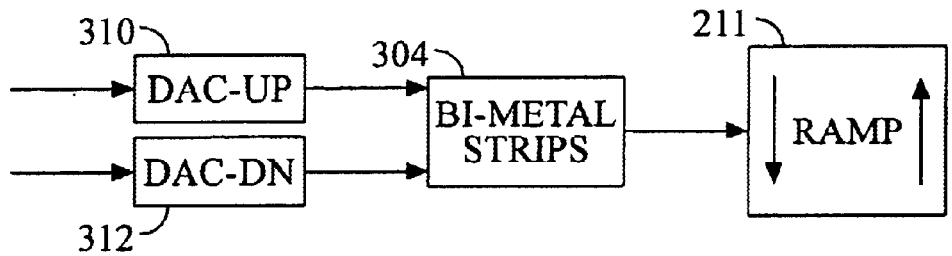
FIG. 3B is an alternative embodiment of FIG. 3A in which two DACs are utilized instead of one, according to one embodiment of the invention.

Alternatively, with reference to FIG. 3B, two DACs may be utilized. An up DAC, DAC-UP 310 (which my be located in base 215), provides current to the bimetallic strip ramp fingers $217_{1-3}$ such that the bimetallic strip ramp fingers $217_{1-3}$ are moved in an upwards vertical direction and a down DAC, DAC-DN 312 (which may be located in base 214), provides current to the bimetallic strip ramp fingers $216_{1-3}$ to move the bimetallic strip ramp fingers $216_{1-3}$ in the vertical direction downwards towards the disk such that the heads 206 are loaded onto the corresponding top and bottom surfaces of disks $201_{1-3}$, as discussed with reference to FIG. 2C. Also, this embodiment can be used in the unloading operation, as previously discussed. Again, the DACs 310 and 312 can also be located at other locations in the disk drive (e.g. on the PCBA).

As previously discussed, each of the bimetallic strip ramp fingers $216_{1-3}$ and $217_{1-3}$ can be controlled in unison or separately by a disk controller system of the PCBA of the disk drive 100 controlling the load and unload operations. Further, the disk controller can control the amount of vertical movement of the bimetallic strip ramp fingers $216_{1-3}$ and $217_{1-3}$ by controlling the DACs to provide a specific amount of current to the bimetallic strip ramp fingers to move the ramp fingers by the desired vertical displacement value such that each head 206 is properly loaded onto the top or bottom surface of each disk $201_{1-3}$ in a controlled manner, as discussed with reference to FIG. 2C. As previously discussed, the vertical displacement values for each ramp finger can be predetermined values or they can be continuously calculated as part of a feedback system. Also, the bimetallic strip ramp fingers $216_{1-3}$ and $217_{1-3}$ can be moved in appropriate up or down directions by the desired vertical displacement value as part of the unloading operation, as previously discussed.

Further, in this arrangement, the load velocity of the heads 206 can be reliably controlled over the life of the ramp 211 because the currents can be adjusted to the granularity of the DACs that are used to control the load current or voltage. Moreover, since the bimetallic strip ramp fingers are metallic, the same ramp 211 can be used for long periods of time because of the low wear and tear associated with the metals used. The metallic nature could also potentially reduce particulate residue and improve product reliability.

In another embodiment, the base structures 214 and 215 of the ramp 211 each may include a MicroElectricalMechanical system (MEMS) device. MEMS devices are known in the art. In this embodiment, a MEMS device of each base 214 and 215 may be coupled to each of the associated ramp fingers $216_{1-3}$ and $217_{1-3}$ of each base, respectively, wherein the loading of the heads 206 of the HSA 202 onto the disks $201_{1-3}$ in a controlled manner may include providing current to the MEMS devices to cause the ramp fingers $216_{1-3}$ and $217_{1-3}$ to be moved in appropriate up or down vertical directions towards the bottom and top surfaces of disks $201_{1-3}$, respectively, until the heads 206 are loaded onto the disks $201_{1-3}$, as previously discussed with reference to FIG. 2C. Also, the MEMS devices may be used to cause the ramp fingers to be moved in appropriate up and down vertical directions towards the bottom and top surfaces of disks, respectively, as part of the unloading operation, as previously discussed.

Figure 4A:
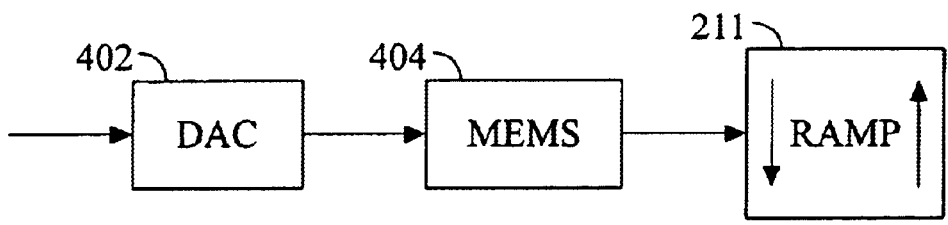
FIG. 4A is a block diagram illustrating that a MEMS device may be used to move the ramp in vertical directions, according to one embodiment of the invention.

With reference FIG. 4A, FIG. 4A shows an embodiment in which a DAC 402 is used to control the amount of current provided to the MEMS device 404 such that the ramp 211 is moved in appropriate up or down vertical directions. In this embodiment, a DAC 402 may be located in each of the base structures 214 and 215 of the ramp 211, respectively. However, the DAC 402 may also be located in other locations of the disk drive (e.g. on the PCBA). Thus, the DACs provide current to the MEMS devices of bases 214 and 215, in order to move the ramp fingers $216_{1-3}$ and $217_{1-3}$ of the ramp 211, respectively, such that the ramp fingers are moved in appropriate up or down vertical directions towards the disks $201_{1-3}$ until each corresponding head 206 is loaded onto the appropriate bottom or top surface of the appropriate disk $201_{1-3}$, as previously discussed with reference to FIG. 2C. Also, this embodiment can be used in the unloading operation, as previously discussed.

Figure 4B:
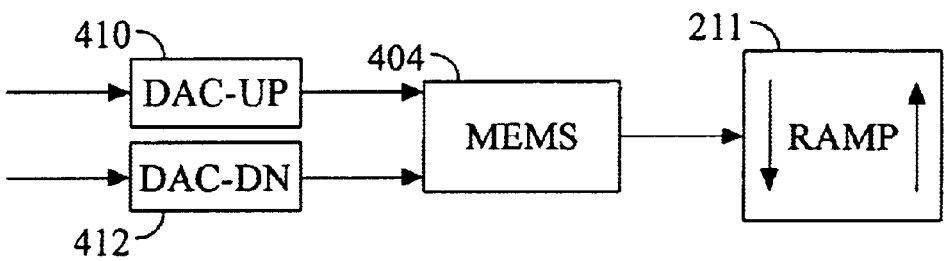
FIG. 4B is an alternative embodiment of FIG. 4A in which two DACs are utilized instead of one, according to one embodiment of the invention.

In another embodiment, as shown in FIG. 4B, an up DAC, DAC-UP 410 (which may be located in base 215), may be utilized to provide a current or voltage to the MEMS device of base 215 in order to move the ramp fingers $217_{1-3}$ of the ramp 211 in an upwards vertical direction; whereas a down DAC, DAC-DN 412 (which may be located in base 214), may be utilized to provide a current or voltage to the MEMS device of base 214 in order to move the ramp fingers $216_{1-3}$ of the ramp 211 in a downwards direction. In this way, the ramp fingers $216_{1-3}$ and $217_{1-3}$ are moved in the appropriate up or down vertical directions towards each of the bottom or top surface of each disk $201_{1-3}$, respectively, until each corresponding head 206 is loaded onto each disk $201_{1-3}$, as previously discussed with reference FIG. 2C. Also, this embodiment can be used in the unloading operation, as previously discussed. Again, the DACs 410 and 412 can also be located at other locations in the disk drive (e.g. on the PCBA).

As with the bimetallic strips, by utilizing a MEMS device to move the ramp fingers $216_{1-3}$ and $217_{1-3}$, the load velocity can be reliably controlled over the life of the ramp 211 because the currents can be adjusted to the granularity of the DAC that is used to control the load current or voltage. In this way, head disk interactions, such as head slaps and lateral motion can be avoided when loading heads onto disks, as previously discussed.

Also, as previously discussed, each of the ramp fingers $216_{1-3}$ and $217_{1-3}$ can be controlled in unison or separately through the MEMS devices of each base 214 and 215, respectively, by a disk controller system of the PCBA of the disk drive 100 controlling the load and unload operations. Further, the disk controller system can control the amount of vertical movement imparted to the ramp fingers $216_{1-3}$ and $217_{1-3}$ by the MEMS devices by controlling the DACs to provide a specific amount of current to the respective MEMS device to move the respective ramp fingers by the desired vertical displacement values such that each head 206 is properly loaded to the top or bottom surface of each disk 201 in a controlled manner, as discussed with reference to FIG. 2C. As previously discussed, the vertical displacement values for each ramp finger can be predetermined values or they can be continuously calculated as part of a feedback system. Also, the ramp fingers $216_{1-3}$ and $217_{1-3}$ can be moved by the MEMS devices in appropriate up or down directions by the desired vertical displacement value as part of the unloading operation, as previously discussed.

Also, it should be appreciated by those skilled in the art that although the ramp has only been described as loading heads onto the outer diameter of disk, that alternative embodiments of the ramp may just as easily be configured to load the heads onto the disk as part of the load operation at the inner diameter of the disk.

Other modifications and embodiments will occur to those of skill in this art and all such modifications and other embodiments are deemed to fall within the scope of the present invention.

We claim:

1. A ramp used in the controlled loading of a head of a head stack assembly (HSA) onto a disk of a disk drive, the HSA including an actuator arm, a head, and a loading surface, the ramp comprising:
   a base structure; and
   at least one ramp finger projecting approximately perpendicularly from the base structure;
   wherein, in order to load the head in a controlled manner onto the disk, the loading surface of the HSA is rotated along the ramp finger until the head is in a load position and then the base structure is actuated in a vertical direction such that the ramp finger is correspondingly actuated in the vertical direction towards the disk until the head is loaded onto the disk.

2. The ramp of claim 1, wherein the ramp finger of the ramp comprises a bimetallic strip.

3. The ramp of claim 2, wherein loading the head of the HSA onto the disk in a controlled manner further includes providing current to the bimetallic strip of the ramp finger causing the ramp finger to be actuated in the vertical direction towards the disk until the head is loaded onto the disk.

4. The ramp of claim 3, further comprising a digital-to-analog converter (DAC), the DAC to control the amount of current provided to the bimetallic strip.

5. The ramp of claim 1, wherein the base structure of the ramp includes a MicroElectricalMechanical system (MEMS) device.

6. The ramp of claim 5, wherein loading the head of the HSA onto the disk in a controlled manner further includes providing current to the MEMS device causing the ramp finger to be moved in a vertical direction towards the disk until the head is loaded onto the disk.

7. The ramp of claim 6, further comprising a digital-to-analog converter (DAC), the DAC to control the amount of current provided to the MEMS device.

8. The ramp of claim 1, wherein the head of the HSA is loaded in a controlled manner onto the disk at an outer diameter of the disk.

9. A method for the controlled loading of a head of a head stack assembly (HSA) onto a disk in a disk drive, the HSA including an actuator arm, a head, and a loading surface, the method comprising:

rotating the loading surface of the HSA along a ramp until the head is in a load position; and loading the head of the HSA onto the disk in a controlled manner, wherein loading the head in a controlled manner includes actuating the ramp in a vertical direction towards the disk until the head is loaded onto the disk.

10. The method of claim 9, wherein the ramp includes a base structure and at least one ramp finger projecting approximately perpendicularly from the base structure.

11. The method of claim 10, wherein the ramp finger of the ramp comprises a bimetallic strip.

12. The method of claim 11, wherein loading the head of the HSA onto the disk in a controlled manner further includes providing current to the bimetallic strip of the ramp finger causing the ramp finger to be actuated in the vertical direction towards the disk until the head is loaded onto the disk.

13. The method of claim 12, further comprising controlling the amount of current provided to the bimetallic strip utilizing a digital-to-analog converter (DAC).

14. The method of claim 10, wherein the base structure of the ramp includes a MicroElectricalMechanical system (MEMS) device.

15. The method of claim 14, wherein loading the head of the HSA onto the disk in a controlled manner further includes providing current to the MEMS device causing the ramp finger to be moved in a vertical direction towards the disk until the head is loaded onto the disk.

16. The method of claim 15, further comprising controlling the amount of current provided to the MEMS utilizing a digital-to-analog converter (DAC).

17. The method of claim 9, wherein the head of the HSA is loaded in a controlled manner onto the disk at an outer diameter of the disk.

18. A disk drive comprising:

a disk for rotation within the disk drive;

a head stack assembly (HSA) including an actuator arm, a loading surface, and a head for writing and reading data to and from the disk; and a ramp used for the controlled loading of the head of the HSA onto the disk, the ramp including a base structure and at least one ramp finger projecting approximately perpendicularly from the base structure;

wherein, in order to load the head in a controlled manner onto the disk, the loading surface of the HSA is rotated along the ramp finger until the head is in a load position and then the base structure is actuated in a vertical direction such that the ramp finger is correspondingly actuated in the vertical direction towards the disk until the head is loaded onto the disk.

19. The disk drive of claim 18, wherein the ramp finger of the ramp includes a bimetallic strip.

20. The disk drive of claim 19, wherein loading the head of the HSA onto the disk in a controlled manner further includes providing current to the bimetallic strip of the ramp finger causing the ramp finger to be actuated in the vertical direction towards the disk until the head is loaded onto the disk.

21. The disk drive of claim 20, further comprising a digital-to-analog converter (DAC), the DAC to control the amount of current provided to the bimetallic strip.

22. The disk drive of claim 18, wherein the base structure of the ramp includes a MicroElectricalMechanical system (MEMS) device.

23. The disk drive of claim 22, wherein loading the head of the HSA onto the disk in a controlled manner further includes providing current to the MEMS device causing the ramp finger to be moved in a vertical direction towards the disk until the head is loaded onto the disk.

24. The disk drive of claim 23, further comprising a digital-to-analog converter (DAC), the DAC to control the amount of current provided to the MEMS device.

25. The disk drive of claim 18, wherein the head of the HSA is loaded in a controlled manner onto the disk at an outer diameter of the disk.

* * * * *